US008076261B2

(12) United States Patent
Hwang et al.

(10) Patent No.: US 8,076,261 B2
(45) Date of Patent: Dec. 13, 2011

(54) PREPARATION METHOD FOR PTCO NANOCUBE CATALYST

(75) Inventors: Inchul Hwang, Seongnam (KR); Nak Hyun Kwon, Seoul (KR); Jae Seung Lee, Yongin (KR); Joon Taik Park, Daejeon (KR); Sang-Il Choi, Daejeon (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 12/840,089

(22) Filed: Jul. 20, 2010

(65) Prior Publication Data
US 2011/0118111 A1    May 19, 2011

(30) Foreign Application Priority Data
Nov. 18, 2009    (KR) .................. 10-2009-0111516

(51) Int. Cl.
| B01J 21/18 | (2006.01) |
| B01J 23/40 | (2006.01) |
| B01J 23/74 | (2006.01) |
| H01M 4/02 | (2006.01) |
| H01M 4/36 | (2006.01) |
| H01M 4/92 | (2006.01) |
| C22C 19/07 | (2006.01) |
| C22C 5/04 | (2006.01) |

(52) U.S. Cl. ......... 502/185; 429/524; 420/436; 420/466
(58) Field of Classification Search .................. 502/185; 429/524, 40; 420/435, 466
See application file for complete search history.

(56) References Cited

U.S. PATENT DOCUMENTS

| 4,983,230 A * | 1/1991 | Overfelt et al. .............. 148/300 |
| 6,676,729 B2 * | 1/2004 | Sun ................................ 75/348 |
| 7,396,797 B2 * | 7/2008 | Tsutsumi et al. ............. 502/185 |
| 7,875,569 B2 * | 1/2011 | Roev et al. .................... 502/180 |
| 2005/0235776 A1 * | 10/2005 | He et al. ......................... 75/255 |
| 2009/0104497 A1 | 4/2009 | Sasaki et al. |

FOREIGN PATENT DOCUMENTS

| JP | 02-061961 A | 3/1990 |
| JP | 2003-045442 A | 2/2003 |
| KR | 10-0823502 | 4/2008 |

OTHER PUBLICATIONS

Santiago, Elisabete I, et al., "Carbon-Supported Pt-Co Catalysts Prepared by a Modified Polyol Process as Cathodes for PEM Fuel Cells", J. Phys. Chem. C 2007, 111, 3146-3151.

* cited by examiner

*Primary Examiner* — Patricia L Hailey
(74) *Attorney, Agent, or Firm* — Edwards Wildman Palmer LLP; Peter F. Corless

(57) ABSTRACT

The present invention features a method for preparing a PtCo nanocube catalyst, the method comprising dissolving a platinum (Pt) precursor, a cobalt (Co) precursor, a surface stabilizer and a reducing agent in a solvent to prepare a solution; heating the solution under an inert gas atmosphere; maintaining the temperature of the solution to obtain PtCo alloy nanocubes; adsorbing the PtCo alloy nanocubes on a carbon support to obtain a catalyst; and removing the surface stabilizer from the catalyst. The disclosed method for preparing a PtCo nanocube catalyst enables preparation of nanocubes with uniform size and cubic shape through a simple process and application for development of high-efficiency fuel cells by preventing change in shape, surface area and composition caused by agglomeration of the nanocubes.

13 Claims, 2 Drawing Sheets

PREPARATION METHOD FOR PTCO NANOCUBE CATALYST

CROSS-REFERENCE(S) TO RELATED APPLICATIONS

This application claims under 35 U.S.C. §119(a) the benefit of Korean Patent Application No. 10-2009-0111516, filed on Nov. 18, 2009, the entire contents of which are incorporated herein by reference.

BACKGROUND OF THE INVENTION

1. Field of the Invention

The present invention relates, generally, to a method for preparing a PtCo nanocube catalyst by dissolving a platinum (Pt) precursor, a cobalt (Co) precursor, a surface stabilizer and a reducing agent in a solvent and heating the mixture to prepare PtCo nanocubes, adsorbing them on a carbon support, and then removing the surface stabilizer. The PtCo nanocube catalyst prepared in accordance with certain preferred embodiments of the present invention may be useful in the development of high-efficiency fuel cells.

2. Background Art

With concerns about the depletion of fossil fuel, research and interest on next-generation energy sources have been increasing worldwide. Accordingly, hydrogen fuel cells have been studied in academic circles and industries as an environmentally-friendly energy source that does not emit pollutants. In particular, hydrogen fuel cells are expected to replace the existing petroleum-based engine in automobiles and are drawing considerable attention in the alternative energy market.

A proton exchange membrane fuel cell (PEMFC) is a system which transforms the chemical energy liberated during the electrochemical reaction of hydrogen and oxygen to electrical energy. Hydrogen is oxidized at the anode, and oxygen is reduced at the cathode, thereby producing water. It is an environmentally-friendly energy source that does not produce any pollutants. The operation temperature is relatively low at 50-100° C. and energy density is high. For these reasons, it may be used as small-scale energy source for household use as well as car engines. However, there are problems to be solved, including low output energy density due to low reaction rate, use of a large amount of platinum (Pt) catalyst, and removal of water vapor formed on the electrode surface.

Present research has focused on addressing these problems and commercializing the PEMFC. In particular, improving cell efficiency through improvement of fuel cell catalyst is considered to be of great importance.

For the metal catalyst used for reduction of oxygen, it is known that alloys of Pt and various transition metals exhibit superior catalytic activity to pure Pt catalyst. Especially, PtCo alloy is reported to show about 3 times better activity (J. K. Norskov, et al. *Angew. Chem. Int. Ed*., vol. 45, p. 2897). Also, it is known that cubic Pt catalyst with crystal planes exhibits better activity than spherical Pt catalyst. Accordingly, in order to suitably improve activity, the metal catalyst is preferably a cubic PtCo alloy with uniform particle size and narrow particle size distribution and be adsorbable on a carbon support.

Recently, nanocolloid synthesis has been the focus of research because it enables the easy preparation of such a metal catalyst. Nanocolloids are advantageous in that they can be suitably arranged without agglomeration because of the surfactant acting as a surface stabilizer. In addition, a high catalytic activity may be suitably attained because loading of the nanocolloids is possible with a relatively small quantity. Consequently, nanocolloids are highly promising since they enable high metal loading and preparation of nano-scale metal alloy with uniform size. Nanocolloid synthesis is advantageous in that uniform interparticle spacing can be suitably achieved by preventing agglomeration or coalescence of nanocolloid particles, alloying with two or more metals is suitably possible since the colloidal structure enables easy control of metal composition by varying the equivalence of metal salt during the synthesis, and uniform size, narrow size distribution and high metal loading can be suitably achieved. However, in order to achieve high catalytic activity, it is necessary to remove the surface stabilizer from the obtained nanocolloid.

Korean Patent No. 10-0823502, Japanese Patent Application Publication No. 2003-045442 and US Patent Application Publication No. 2009-0104497, incorporated by reference in their entireties herein, disclose preparation of Pt alloy catalysts, including PtCo; however the methods are not appropriate for industrial-scale production of catalyst because they require high-temperature heat treatment.

Accordingly, methods for improving catalytic activity are needed in the art.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a method for preparing a PtCo nanocube catalyst with superior surface characteristics and activity.

In preferred embodiments, the present invention provides a method for suitably preparing a PtCo nanocube catalyst, comprising dissolving a platinum (Pt) precursor, a cobalt (Co) precursor, a surface stabilizer and a reducing agent in a solvent to suitably prepare a solution; heating the solution under an inert gas atmosphere; suitably maintaining the temperature of the solution to obtain PtCo alloy nanocubes; adsorbing the PtCo alloy nanocubes on a carbon support to obtain a catalyst; and suitably removing the surface stabilizer from the catalyst.

In certain preferred embodiments of the present invention, a catalyst for a fuel cell with superior activity and high efficiency may preferably be prepared through a simple process by preventing change in shape, surface area and composition caused by agglomeration of nanoparticles.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

Figure 1:
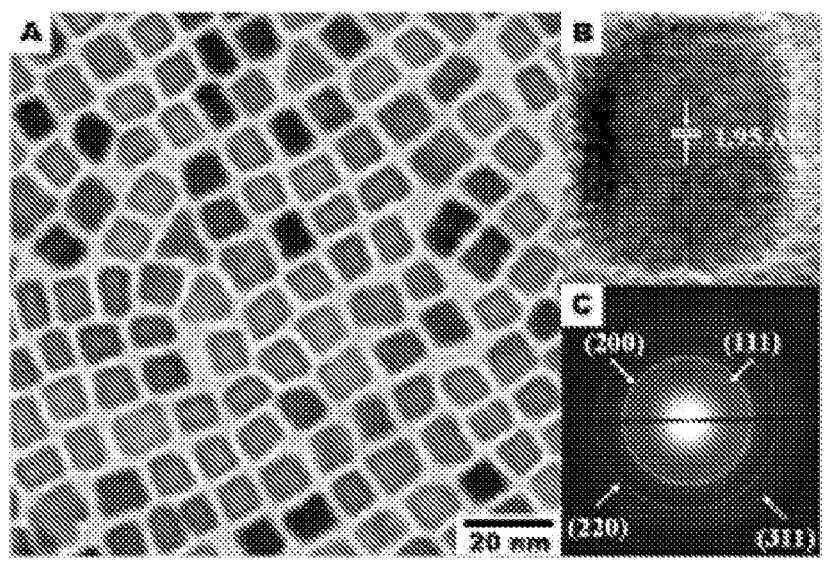
FIG. 1 shows transmission electron micrographs of PtCo alloy nanocubes prepared in accordance with the present invention (A: low magnification, B: high magnification, C: selective transmission pattern)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DESCRIPTION OF SPECIFIC EMBODIMENTS

As described herein, the present invention includes a method for preparing a PtCo nanocube catalyst, comprising dissolving a platinum (Pt) precursor, a cobalt (Co) precursor, a surface stabilizer and a reducing agent in a solvent to prepare a solution, heating the solution under an inert gas atmosphere, maintaining the temperature of the solution to obtain PtCo alloy nanocubes, adsorbing the PtCo alloy nanocubes on a carbon support to obtain a catalyst, and removing the surface stabilizer from the catalyst.

The invention also features a fuel cell comprising a PtCo nanocube catalyst prepared by any one of the methods described herein.

The advantages, features and aspects of the invention will become apparent from the following description of the embodiments with reference to the accompanying drawings, which is set forth hereinafter.

The present invention relates to a method for preparing a PtCo nanocube catalyst, preferably comprising dissolving a platinum (Pt) precursor, a cobalt (Co) precursor, a surface stabilizer and a reducing agent in a solvent to suitably prepare a solution; heating the solution under an inert gas atmosphere; suitably maintaining the temperature of the solution to obtain PtCo alloy nanocubes; suitably adsorbing the PtCo alloy nanocubes on a carbon support to obtain a catalyst; and suitably removing the surface stabilizer from the catalyst.

Preferably, the Pt precursor may be one or more selected from, but not limited only to, platinum(II) acetylacetonate, platinum chloride and platinum hexaacetylacetonate, and the Co precursor may be one or more selected from, but not limited only to, dicobalt octacarbonyl and cobalt chloride. In further preferred embodiments, the Co precursor may be used in an amount of 0.3 to 2 mol, preferably 0.3 to 0.7 mol, based on 1 mol of the Pt precursor. Preferably, if the Co precursor is used less than 0.3 mol, it decreases its portion in the resulting alloy and thus the low oxygen reduction activity of the catalyst becomes low, thereby suitably obtaining octapod-shaped particles. In other further embodiments, if the Co precursor is used more than 0.7 mol, it suitably increases the rate of the transition metal and thus the low oxygen reduction activity of the catalyst becomes low, thereby suitably obtaining cuboctahedron-shaped particles.

Preferably, the surface stabilizer allows arrangement of the nanoalloy particles without agglomeration and enables suitable loading of the nanoparticles with a relatively low amount, thereby providing suitable catalytic activity. According to certain preferred embodiments, the surface stabilizer may be one or more selected from oleic acid, oleylamine, trioctylphosphine and triphenylphosphine, a mixture of two or more of them being preferred. Preferably, when two surface stabilizers are used, a mixture of oleic acid and oleylamine is preferred, a 1:1 mixture of oleic acid and oleylamine being preferred. Preferably, the surface stabilizer may be used in an amount of 2 to 20 mol, preferably 2 to 15 mol, more preferably 2 to 10 mol, based on 1 mol of the Pt precursor. In certain exemplary embodiments, if the surface stabilizer is used less than 2 mol, particle agglomeration may occur. In other certain exemplary embodiments, if the surface stabilizer is used more than 10 mol, octapod-shaped particles may be suitably obtained.

According to preferred embodiments of the present invention, the reducing agent may be any one capable of reducing the precursors. Preferably, the reducing agent may be one or more selected from 1,2-hexadecanediol, ethylene glycol and 1,5-pentanediol. Preferably, the reducing agent is used in an amount of 1 to 5 mol, preferably 1 to 3 mol, based on 1 mol of the Pt precursor. According to certain exemplary embodiments, If the reducing agent is used less than 1 mol, Pt may not be reduced. In other exemplary embodiments, if the reducing agent is used more than 5 mol, particle agglomeration may occur.

Preferably, since the Pt precursor and the Co precursor are reacted in a solution state, a solvent capable of dissolving them is used. Preferably, the solvent may be one or more selected from, but not necessarily limited to, dioctyl ether, ethylene glycol, 1-octadecene and benzyl ether. In order to facilitate dissolution, the dissolving is preferably carried out at 100 to 120° C.

In other further embodiments of the present invention, while heating the solution under the inert gas atmosphere, the inert gas suitably prevents the metals reduced from the Pt precursor and the Co precursor by the reducing agent from being oxidized by oxygen in the air. Preferably, the inert gas may be one or more selected from nitrogen, helium, argon, neon, krypton, xenon and radon. According to further preferred embodiments, the solution is heated to improve reactivity of the Pt precursor and the Co precursor. Preferably, the heating may be carried out from the temperature at which the reaction begins to 200° C., preferably from 120° C. to 200° C., at a rate of 0.5 to 10° C./min.

In further preferred embodiments, the temperature of 200° C. may be suitably maintained for 60 to 90 minutes to obtain the PtCo alloy nanocubes.

Preferably, when adsorbing the PtCo alloy nanocubes on the carbon support to obtain the catalyst, the temperature of the solution is suitably decreased to normal temperature and a solvent which does not dissolve the nanoalloy is preferably added to precipitate the nanoalloy dissolved in the solution and thereby obtain the nanoalloy. Then, after centrifuge, the supernatant is removed. In further preferred embodiments, the solvent used for this purpose may be one or more selected from ethanol, methanol and acetone. After the removal of the supernatant, the precipitate is suitably dissolved in an organic solvent. The organic solvent may be one or more selected from, but not only limited to, toluene, hexane and pentane. Preferably, after the remaining solvent is completely removed in a vacuum, the remaining solid is dissolved again in an organic solvent.

In further preferred embodiments, the thus obtained PtCo alloy nanocubes may be suitably adsorbed on the carbon support to prepare the catalyst. Preferably, the carbon support on which the PtCo alloy nanocubes are suitably adsorbed may be any one to which the nanoalloy may be adsorbed and that can serve as a catalyst support for a fuel cell. In certain preferred embodiments, for example, but not limited to, ketjen black, carbon nanotube, fullerene, or the like may be used. Preferably, the PtCo alloy nanocubes may be adsorbed on the carbon support in an amount of 10 to 60% based on the weight of the carbon support. In certain preferred embodiments, if the PtCo alloy nanocubes are suitably adsorbed in an amount less than 10% based on the weight of the carbon support, catalytic activity may be suitably insufficient. In other further embodiments, if they are suitably adsorbed in an amount exceeding 60%, catalytic activity may not increase in proportion to the amount, and mechanical properties of the catalyst may be suitably deteriorated because of the lack of the carbon support.

According to further preferred embodiments of the present invention, the surface stabilizer is suitably removed from the catalyst. Preferably, the catalyst wherein the PtCo alloy nanocubes are suitably adsorbed on the carbon support include the surface stabilizer used to obtain the nanoalloy. Preferably, the surface stabilizer stabilizes the surface of the PtCo alloy nanocubes, and further, it also preferably reduces oxygen reduction activity. Accordingly, the surface stabilizer has to be suitably removed. Accordingly, in certain embodiments of the present invention, a surface stabilizer removal agent is preferably used. In further related embodiments, preferably, the surface stabilizer removal agent may be diethyl ether. After removing the surface stabilizer from the PtCo alloy nanocube catalyst using the surface stabilizer removal agent, centrifuge is carried out and the supernatant is removed. This procedure is repeated 3 to 10 times. According to further preferred embodiments, the remaining material may be completely removed in a vacuum.

The method for preparing a PtCo nanocube catalyst according to preferred embodiments of the present invention as described herein, allows preparation of a PtCo nanoalloy catalyst with superior surface characteristics and activity since the cubic structure is suitably maintained without high-temperature heat treatment. Accordingly, it may be usefully applied for development of high-efficiency fuel cell catalysts and fuel cells.

EXAMPLES

Examples and experiments are described herein. The following examples and experiments are for illustrative purposes only and are not intended to limit the scope of the present disclosure.

Example 1

Preparation of PtCo Nanocubes

Platinum(II) acetylacetonate ($Pt(acac)_2$, 0.050 g, 0.127 mmol), dicobalt octacarbonyl ($Co_2(CO)_8$, 0.0109 g, 0.064 mmol), oleic acid (1.0 mL), oleylamine (1.0 mL) and 1,2-hexadecanediol (0.03 g, 0.12 mmol) were dissolved in benzyl ether (8 mL) under an argon atmosphere and heated to 120° C. The temperature was raised from 120° C. to 200° C. at a rate of 3° C./min and maintained at 200° C. for 90 minutes. After the reaction, the temperature was lowered to normal temperature. After adding ethanol (20 mL), followed by centrifuge at 3000 rpm for 10 minutes, the supernatant was suitably discarded and the black precipitate was suitably dissolved in toluene. Any remaining ethanol solvent was completely removed in vacuum and the remaining solid was dissolved again in toluene to obtain PtCo alloy nanocubes.

Example 2

Adsorption of PtCo Nanocubes on Ketjen Black and Removal of Surface Stabilizer

The PtCo nanocubes prepared in Example 1 were adsorbed on a carbon support ketjen black (Ketjen Black International Company, Japan) to prepare a catalyst.

The PtCo nanocubes prepared in Example 1 were added to a toluene solution in an amount of 40% based on the weight of the carbon support. Then, after adding the carbon support to the toluene solution, the mixture was stirred at 40° C. for a day at 300 rpm to prepare the catalyst.

After the reaction, the solvent was completely removed and thus prepared catalyst was washed several times with diethyl ether to remove the surface stabilizer from the catalyst. Then, after centrifuge and removal of the supernatant, the remaining material was completely removed in vacuum to obtain the catalyst with the surface stabilizer removed.

Test Example 1

The PtCo nanocubes prepared in Example 1 were observed under a transmission electron microscope. The result is shown in FIG. 1.

FIG. 1 shows transmission electron micrographs of PtCo alloy nanocubes prepared in accordance with preferred embodiments of the present invention (A: low magnification, B: high magnification, C: selective transmission pattern).

As seen in FIG. 1, the nanoparticles had considerably uniform size (average size: 7.8±0.5 nm) and cubic shape, the lattice plane of each nanoparticle having high crystallinity. Upon analysis of the nanoparticle composition by energy dispersive X-ray spectroscopy (EDS) and inductively coupled plasma atomic emission spectroscopy (ICP-AES), it was demonstrated that PtCo nanocubes comprising Pt and Co at a ratio of 9:1 (87.2:12.8 and 89.5:10.5) were synthesized.

Test Example 2

Figure 2:
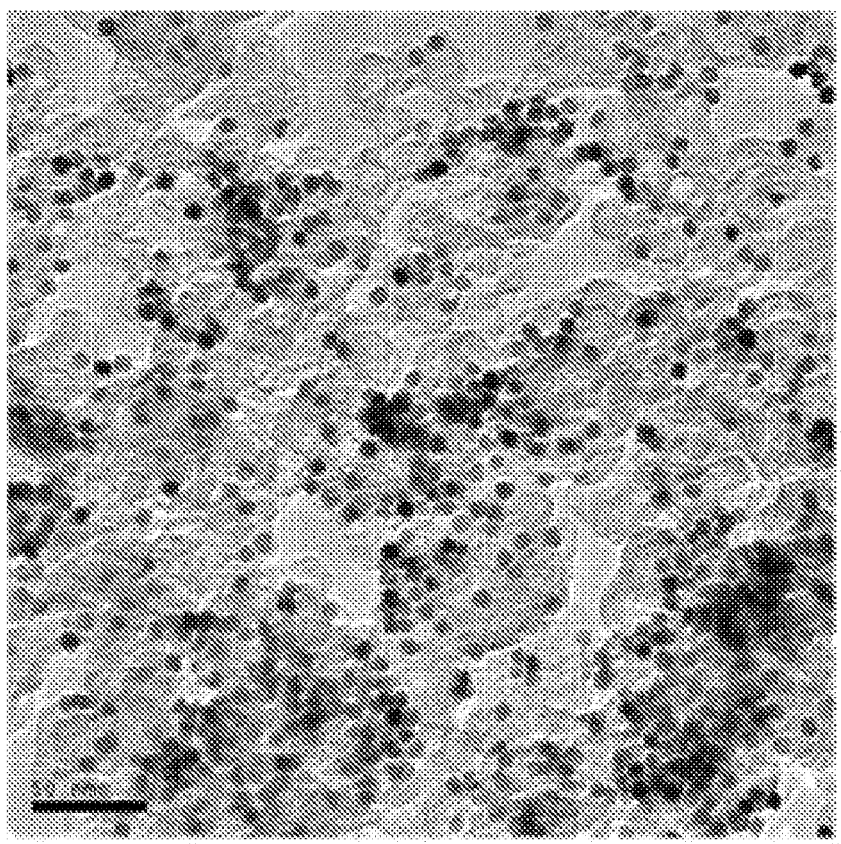
FIG. 2 shows a transmission electron micrograph of PtCo alloy nanocubes prepared in accordance with the present invention adsorbed on a carbon support.

The PtCo alloy nanocube catalyst obtained in Example 2 was observed under a transmission electron microscope. The change in shape and structure of the PtCo alloy nanocubes in the catalyst was investigated. The result is shown in FIG. 2.

When the PtCo alloy nanocubes were adsorbed on the ketjen black carbon support in Example 2, there was no change in particle shape or structure of the nanoalloy. No change was observed even after the removal of the surface stabilizer from the catalyst using diethyl ether.

Test Example 3

Measurement of Effective Surface Area of PtCo Nanocube Catalyst

The PtCo alloy nanocube catalyst prepared in Example 2 (5 mg) and Nafion 117 (Fluka, 0.10 mL) were added to distilled water (2 mL) and dispersed for about 10 minutes using an ultrasonic processor. The resultant PtCo ink solution was injected onto a carbon electrode surface using a 5 μL syringe. Then, the electrode was carefully dried in an oven at 70° C. so that the PtCo nanocube ink solution could be coated uniformly on the entire area of a disk 3 mm in diameter.

Next, cyclic voltammetry experiment was performed using a general three-electrode setup with a carbon working electrode (a disk 3 mm in diameter, BAS), a Pt counter electrode (a wire 0.5 mm in diameter and 5 cm in length, BAS) and an Ag/AgCl reference electrode (Ag/AgCl, saturated NaCl atmosphere), and using Autolab (PGSTAT 10, Eco Chemie, the Netherlands) electrochemical analyzer. Measurement was made using a 0.5 M sulfuric acid solution under a saturated nitrogen atmosphere, while varying the voltage from −0.2 to 1.0 V at a rate of 20 mV/s.

Figure 3:
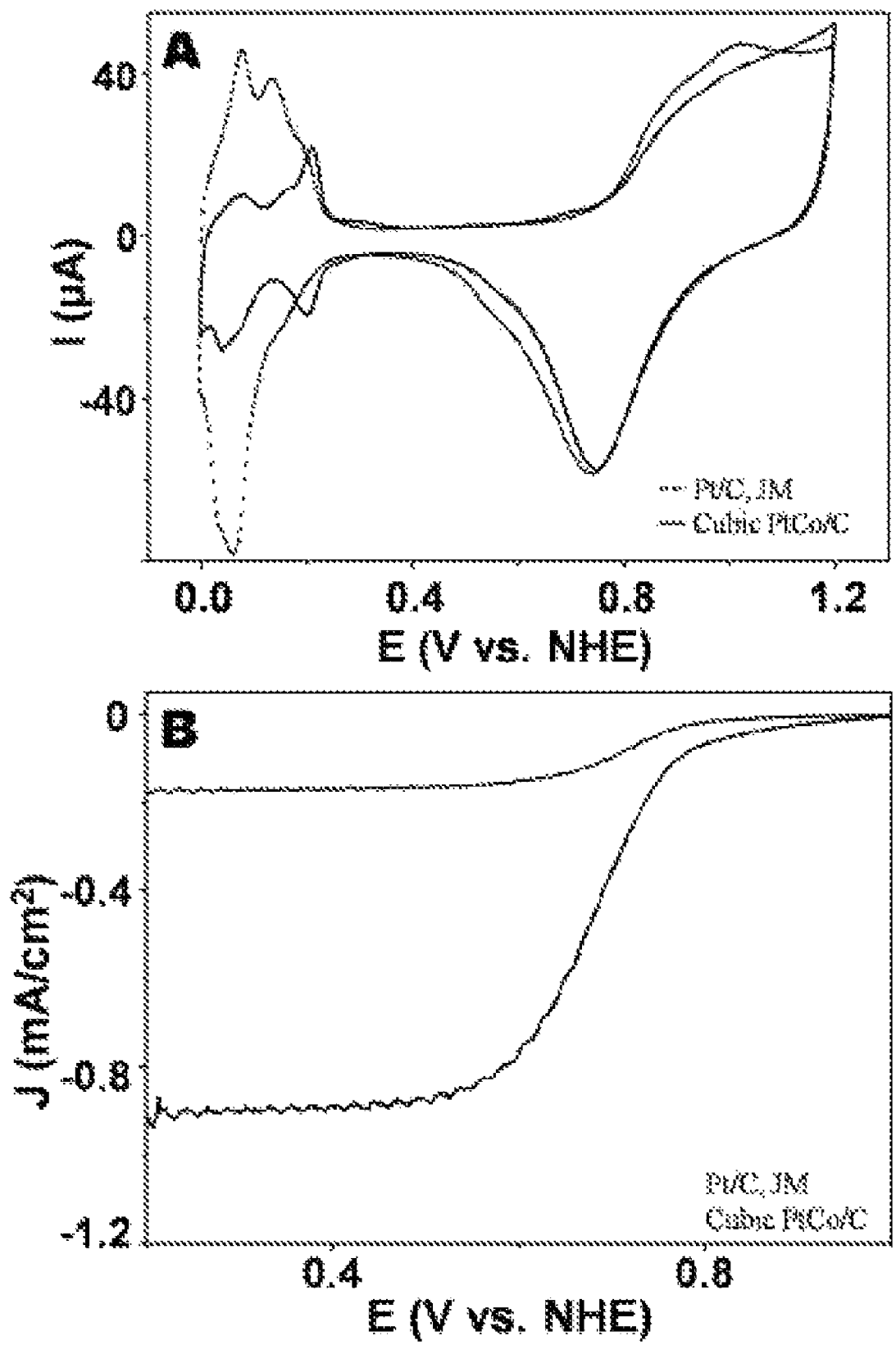
FIG. 3A shows cyclic voltammograms of a PtCo alloy nanocube catalyst prepared in accordance with the present invention (solid curve) and a commercially available catalyst (dotted curve), and B shows an activity of oxygen reduction.

FIG. 3A shows a cyclic voltammogram of the PtCo alloy nanocube catalyst prepared in Example 2.

As shown in FIG. 3A, the PtCo alloy nanocube catalyst prepared in Example 2 (solid curve) had 3 times smaller effective surface area than a commercially available catalyst (Johnson Matthey catalyst, dotted curve). The strong peak of the PtCo nanocube catalyst at 0.2 V is due to hydrogen desorption on the Pt crystal plane and shows that the PtCo nanoalloy has a cubic shape. Also, the actual surface area almost corresponds to the surface area value of the PtCo nanocube catalyst, which is owing to the effective removal of the surface stabilizer.

Test Example 4

Measurement of Oxygen Reduction Activity of PtCo Nanocube Catalyst

As in Test Example 3, the PtCo nanocube ink solution (5 μL) was injected onto a carbon electrode surface. Then, the electrode was carefully dried in an oven at 70° C. so that the PtCo nanocube ink solution could be coated uniformly on the entire area of a disk 3 mm in diameter.

The catalytic activity of oxygen reduction was measured using a 0.5 M sulfuric acid solution under a saturated oxygen atmosphere, while varying the voltage from 0.0 to 1.0 V at a rate of 10 mV/s. The result is shown in FIG. 3B.

As seen in FIG. 3B, the PtCo alloy nanocube catalyst prepared in Example 2 (solid curve) had about 4 times higher half-wave potential than the commercially available catalyst (Johnson Matthey catalyst, dotted curve). This shows that the catalyst prepared through synthesis of uniform PtCo nanocubes and effective removal of surface stabilizer exhibits superior catalytic activity.

While the present invention has been described with respect to the specific embodiments, it will be apparent to those skilled in the art that various changes and modifications may be made without departing from the spirit and scope of the invention as defined in the following claims.

What is claimed is:

1. A method for preparing a PtCo nanocube catalyst, comprising:
   dissolving a platinum (Pt) precursor, a cobalt (Co) precursor, a surface stabilizer and a reducing agent in a solvent to prepare a solution;
   heating the solution under an inert gas atmosphere;
   maintaining the temperature of the solution to obtain PtCo alloy nanocubes;
   adsorbing the PtCo alloy nanocubes on a carbon support to obtain a catalyst; and
   removing the surface stabilizer from the catalyst,
   wherein said heating is carried out from 120° C. to 200° C. at a rate of 0.5 to 10° C/min, and the temperature of 200° C. is maintained for 60 to 90 minutes to obtain the PtCo alloy nanocubes.

2. The method for preparing a PtCo nanocube catalyst according to claim 1, wherein the Pt precursor is one or more selected from the group consisting of: platinum(II) acetylacetonate, platinum chloride and platinum hexaacetylacetonate.

3. The method for preparing a PtCo nanocube catalyst according to claim 1, wherein the Co precursor is dicobalt octacarbonyl, cobalt chloride or a mixture thereof.

4. The method for preparing a PtCo nanocube catalyst according to claim 1, wherein the surface stabilizer is one or more selected from the group consisting of: oleic acid, oleylamine, trioctylphosphine and triphenylphosphine.

5. The method for preparing a PtCo nanocube catalyst according to claim 1, wherein the reducing agent is one or more selected from the group consisting of: 1,2-hexadecanediol, ethylene glycol and 1,5-pentanediol.

6. The method for preparing a PtCo nanocube catalyst according to claim 1, wherein the solvent is one or more selected from the group consisting of: dioctyl ether, ethylene glycol, 1-octadecene and benzyl ether.

7. The method for preparing a PtCo nanocube catalyst according to claim 1, wherein the inert gas is one or more selected from the group consisting of: nitrogen, helium, argon, neon, krypton, xenon and radon.

8. The method for preparing a PtCo nanocube catalyst according to claim 1, wherein the carbon support is one or more selected from the group consisting of: ketjen black, carbon nanotube and fullerene.

9. The method for preparing a PtCo nanocube catalyst according to claim 1, wherein the surface stabilizer is removed using diethyl ether as a surface stabilizer removal agent.

10. A method for preparing a PtCo nanocube catalyst, comprising:
    dissolving a platinum (Pt) precursor, a cobalt (Co) precursor, a surface stabilizer and a reducing agent in a solvent to prepare a solution;
    heating the solution;
    maintaining the temperature of the solution to obtain PtCo alloy nanocubes; and
    adsorbing the PtCo alloy nanocubes on a carbon support to obtain a catalyst,
    wherein said heating is carried out from 120° C. to 200° C. at a rate of 0.5 to 10° C/min, and the temperature of 200° C. is maintained for 60 to 90 minutes to obtain the PtCo alloy nanocubes.

11. The method for preparing a PtCo nanocube catalyst of claim 10, wherein the solution is heated under an inert gas atmosphere.

12. The method for preparing a PtCo nanocube catalyst of claim 10, further comprising removing the surface stabilizer from the catalyst.

13. A method for preparing a PtCo nanocube catalyst, comprising:

dissolving a platinum (Pt) precursor, a cobalt (Co) precursor, a surface stabilizer and a reducing agent in a solvent to prepare a solution;

heating the solution;

maintaining the temperature of the solution to obtain PtCo alloy nanocubes; and adsorbing the PtCo alloy nanocubes on a carbon support to obtain a catalyst, wherein the surface stabilizer is removed using diethyl ether as a surface stabilizer removal agent.

* * * * *